United States Patent [19]

Parriaux et al.

[11] Patent Number: 4,984,863
[45] Date of Patent: Jan. 15, 1991

[54] FORCE METER WITH OPTICAL WAVEGUIDE INTEGRATED IN A SUBSTRATE

[75] Inventors: Olivier Parriaux, Lausanne; Victor Neuman, Corcelles; Guy Voirin, Neuchâtel, all of Switzerland

[73] Assignee: Centre Suisse D'Electronique et de Microtechnique SA, Neuchatel, Switzerland

[21] Appl. No.: 410,520

[22] Filed: Sep. 21, 1989

[30] Foreign Application Priority Data

Sep. 23, 1988 [FR] France .................. 88 12433

[51] Int. Cl.⁵ .............................................. G02B 6/12
[52] U.S. Cl. .............................. 350/96.11; 350/96.14
[58] Field of Search ................ 350/96.11, 96.14, 96, 350/94, 96.15

[56] References Cited

U.S. PATENT DOCUMENTS 4,253,060  2/1981  Chen ........................... 350/96.14 X
4,773,063  9/1988  Hunsperger et al. ......... 350/96.11 X
4,861,128  8/1989  Ishikawa et al. ............. 350/96.14 X

FOREIGN PATENT DOCUMENTS 267036  5/1988  European Pat. Off. .

OTHER PUBLICATIONS

IBM Technical Disclosure Bulletin, No. 2, vol. 24, Jul. 1981, pp. 893-894, H. Korth, "Integrated Optical Force and Stress Sensor".

Primary Examiner—John D. Lee
Assistant Examiner—Phan T. Heartney
Attorney, Agent, or Firm—Parkhurst, Wendel & Rossi

[57] ABSTRACT

An optical waveguide force meter for the measurement of forces or stresses integrated on a single substrate, including: a single-mode transducer waveguide supporting only the stresses which are applied through the intermediate portion of an upper plate of the force meter; a coupling/mixing grating having N focussing concave gratings provided adjacent an exit end of the optical waveguide; N detectors arranged at each of the N focussing points of waves defracted by the coupling-/mixing grating; N TM polarization filters arranged respectively between each concave grating and each detector; and a single-mode laser source. The waveguide, coupling/mixing grating and polarization filters are all provided on the single substrate. The single-mode laser source and detectors are supported by the substrate and by an underlying base plate member.

5 Claims, 3 Drawing Sheets

FORCE METER WITH OPTICAL WAVEGUIDE INTEGRATED IN A SUBSTRATE

BACKGROUND OF THE INVENTION

The invention relates to a force meter for measuring forces or stresses in general, and relates more particularly to a force meter comprising an optical waveguide integrated in a substrate propagating two perpendicular polarization modes and whose refractive indexes vary in response to the application of a force, thus introducing a phase difference between the modes propagated which is proportional to the applied force.

It has already been proposed in Dändliker et al. Swiss Patent No. 661985 to use a birefringent single-mode optical fiber to measure a force applied thereto. The fiber is wound into the form of a helix, the turns of which are arranged between two plates. The application of a force to one of the plates with respect to the other induces a variation in the effective indexes of the polarization modes within the fiber. This photoelastic effect has, moreover, already been described in an article by Scott C. Rashleigh "Origins and Control of Polarization Effects in Single-Mode Fibers" (Journal of Lightwave Technology, Vol. LT-1, No. 2, June 20, 1983, pp. 312-331). In the above-mentioned Patent, the detection by interferometric measuring between polarization modes is effected with the aid of discrete optical elements which introduce a phase shift between the waves propagated by the fiber.

The idea of using an optical fiber as a transducer creates a certain number of disadvantages, of which the following should be mentioned.

The load transmitted through the intermediary of the plates is not directly and wholly applied to the core of the fiber. Between the core, which constitutes the active medium, and the plates there exists an intermediate medium consisting of the cladding of the fiber, the presence of which diminishes the action of the force on the core.

Further, the use of an optical fiber restricts the choice of fibers to only those comprising a metal or ceramic jacket, because the use of fibers with plastic jackets induces hysteresis, a creep effect and a variation in the force bearing surface. Although ideal, the use of a jacket-free fiber cannot be contemplated, due to its short life span.

Still further, the obtainment of perfect contact between the fiber and the plates requires both a high level of uniformity in the diameter of the fiber used and very flat plates, which thus result in high production costs.

Moreover, the conventional optical detection device described in the above-mentioned Swiss Patent comprises several discrete optical elements such as a quarter-wave plate and a half-wave plate, a polarizer and detectors. Such a device, having recourse to a configuration of discrete components, is difficult to miniaturize.

Finally, the problem arises of immobilization of the fiber between the plates. It is necessary that the fiber be protected, its fixation must not induce any parasitic birefringence, it must be in contact with the plates over all the interaction length, and the force must be transmitted thereto in a uniform manner. The Swiss Patent does not provide any element of a solution to this problem.

SUMMARY OF THE INVENTION

An object of the present invention is to provide an integrated optical force meter which overcomes the disadvantages mentioned above.

Another object of the present invention is to provide a monolithic meter integrating on the same substrate both the transducer and the detection device.

Still another object of the present invention is to provide a meter whose sensitivity is superior to that of a conventional optical fiber meter.

The advantages of the invention are principally that the meter is simple to manufacture and assemble; it exhibits stable and reproducible performance levels; the waveguide, because it is integrated, is well protected; the influence of temperature does not modify the distribution of the force along the guide, since all the layers may be of the same material; the level of sensitivity is intrinsically superior to that of conventional optical fiber meters, since the force acts directly, uniformly and wholly on the core of the waveguide. The improvement factor over conventional meters is on the order of 10.

Other objects, characteristics and advantages of the present invention will become clearer from the following description of preferred exemplary embodiments with reference to the attached drawings.

BRIEF DESCRIPTION OF THE INVENTION

DETAILED DESCRIPTION OF THE PREFERRED EMBODIMENTS

Figure 1:
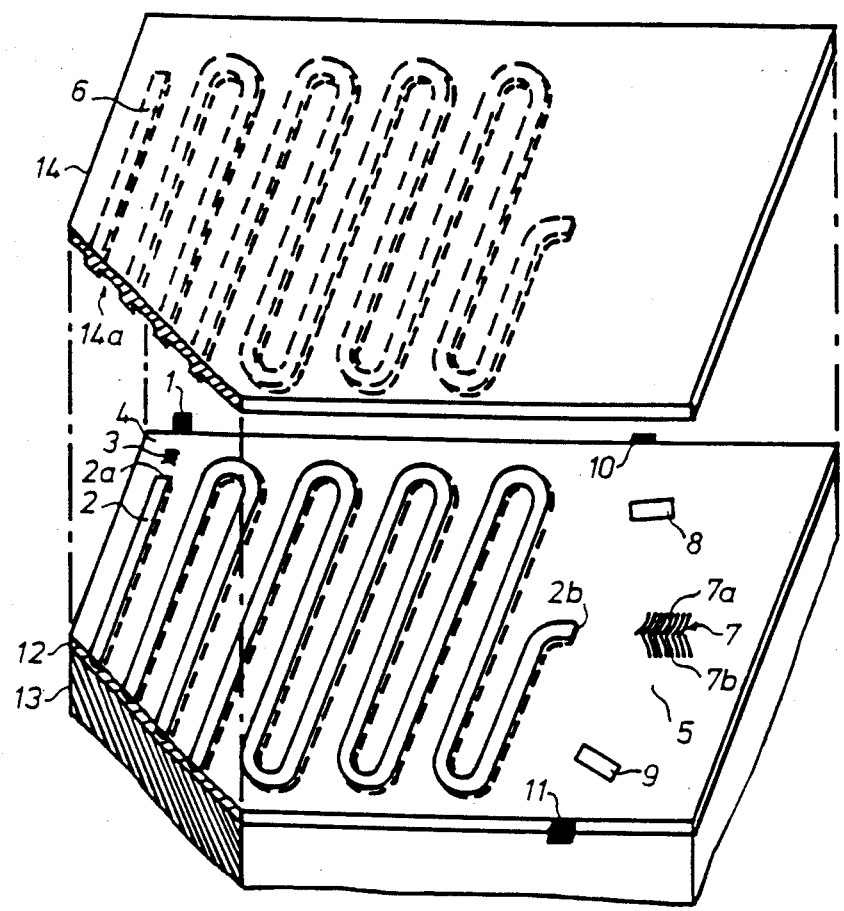
FIG. 1 shows a first exemplary embodiment of the force meter of the present invention which integrates on the same substrate a transducer and a read head and supports the light source and the detection system.

The exemplary embodiment shown in FIG. 1 shows a laser source 1 supported by a substrate 12 in which there is windingly arranged, over a length of approximately a meter, a single-mode waveguide 2 of from 6 to 8 μm in width. The single-mode waveguide 2 is defined by its two birefringence axes respectively perpendicular to and in the plane of the substrate 12. The direction of application of the force to be measured is perpendicular to the plane of the substrate 12. The wave emitted by the source 1 is such that the two polarization modes (known below as TE mode and TM mode) are identically excited and that its representative vector forms an angle of 45° with the birefringence axes of the waveguide 2. The entry 2a and exit 2b of the waveguide 2 open respectively into a planar entry guide 4 and a planar exit guide 5.

Figure 3A:
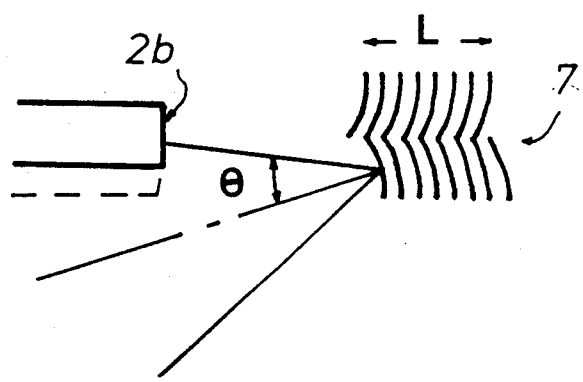
FIG. 3 is a detailed representation of the coupling/mixing grating.
Figure 3B:
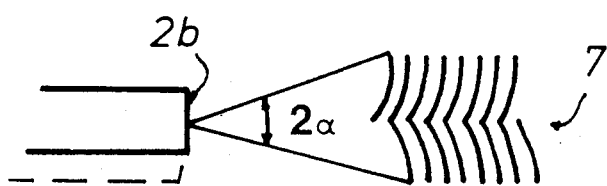

A focussing coupling grating 3 is integrated in the planar entry guide 4 between the source 1 and the entry 2a of the waveguide 2. A coupling/mixing grating 7 is integrated in the planar exit guide 5 and faces the exit 2b of the waveguide 2. The grating 7 consists of two concave focussing gratings 7a and 7b offset longitudinally by ¼ of the period or beat length $L_b$ between the two planar polarization modes. The two gratings are fed at an oblique angle of incidence $\theta$ and have an interaction length L on the order of 1 to 2 mm (FIG. 3). By way of example: for a wavelength of 0.63 μm the period of the gratings is on the order of 0.27 μm for an angle of incidence θ on the order of 21°±2° and/or on the order of 0.66 μm for an angle of incidence of the order of 67°±2°; the coupling rate between modes then being 50%. Two TM polarization filters 8 and 9 are integrated on each side of the coupling/mixing grating 7. Two detectors 10 and 11 are fixed on the edge of the substrate 12 in an extension of the coupling/mixing grating 7 and the TM polarization filters 8 and 9, at the focussing point of the coupling/mixing grating 7.

The active part of the meter integrating, on the substrate 12, the transducing waveguide 2 and the read head (coupling/mixing grating 7 and TM polarization filters 8 and 9) and supporting the light source and the detection system is inserted between a base plate 13, which serves to stiffen the structure, and a load plate 14 constituted and arranged in such a way as not to be in contact with the single-mode waveguide 2. The load plate 14 comprises on its lower surface 14a a meander-like winding arrangement 6 having substantially the same configuration as that of the single-mode waveguide 2. The configuration of the winding arrangement 6 is at least as wide as the configuration of the optical waveguide 2. The substrate 12 is a passive substrate of very thin glass of approximately 0.2 to 0.5 mm and is capable of adapting to faults in the surface evenness of the load plate 14, without this resulting in notable initial stresses on the waveguide 2.

The laser source 1 excites the single-mode waveguide 2 via a focussing coupling grating 3 which diffracts the emitted light in the plane of the planar entry guide 4 present therebelow and focuses the two polarization modes towards the entry 2a of the waveguide 2. The waveguide 2 propagating the TE and TM polarization modes is subjected to the force to be measured, which is applied perpendicularly to the plane of the substrate 12 through the intermediary of the load plate 14. The force induces, by photoelastic effect, a variation in the effective mode indexes and introduces or modifies the birefringence in the waveguide 2. These results then form a phase shift between the two orthogonal polarization modes proportional to the force applied.

The two polarization modes leaving the waveguide 2 are propagated in the planar exit guide 5 with a divergence $2\alpha$ (see FIG. 3) and in the direction of the coupling/mixing grating 7.

The two incident fields are picked up by the two concave focussing gratings 7a and 7b. These gratings each reflect and focus half the light cone leaving the single-mode guide 2, the modes capable of propagation in the planar exit guide 5 being the same as the modes leaving the single-mode guide 2, i.e., TE and TM polarization modes, the propagation taking place in another direction, however. The angle of incidence θ is selected in such a way that the coupling/mixing grating 7 converts, with an identical coupling rate, the two incident modes $TE_i$ and $TM_i$ into the diffracted modes $TE_{d'}$ and $TE_{d''}$.

The planar entry guide 4 below the coupling grating 3, like the planar exits guide 5 below the coupling/mixing grating 7, has a weak birefringence so that the conditions of phase agreement are satisfied for the two polarization modes and so that their focal points, or concentration zones, overlap. The representative vectors of the diffracted modes $TE_{d'}$ and $TE_{d''}$ coming from the incident modes $TE_i$ and $TM_i$ are then as collinear as possible. The undesired diffracted modes $TM_{d'}$ and $TM_{d''}$ are filtered by the TM polarization filters 8 and 9 by resonant coupling of the TM wave to the plasmon mode being propagated along the metal layer of the TM polarization filter 8 and 9.

The fact that the load plate 14 is only in contact with the single-mode waveguide 2 through the intermediary of the winding arrangement 6 permits transmission of the force to be measured to the waveguide 2 and the base plate 13 in turn permits stiffening of the structural assembly.

In the exemplary embodiment the two detectors 10 and 11 deliver sinusoidal electrical signals in quadrature of which the phase angle is proportional to the force applied.

The source 1 and the entry coupling grating 3 may be as described by H. Nishihara et al., "Grating Devices for Integrated Optics", Proceedings of the Fourth European Conference on Integrated Optics ECIO 87 (Glasgow), pp. 139–144.

Instead of using an entry coupling grating, it is also possible to excite the end of the waveguide 2 by means of a birefringent leader fiber, the guide 2 then being extended as far as the end of the substrate 12.

The waveguide 2 and the planar entry and exit guides 4 and 5 are formed at the same time in a passive substrate 12 which may, for example, be a silicon wafer. The technique of ion exchange in glass, described by J. E. Gortych et al., "Fabrication of planar optical waveguides by K+ ion exchange in BK7 glass", Optics Letters /Vol. 11, No. 2/ Feb. 1986, pp. 100–102, may advantageously be used to fabricate guides having losses lower than 0.02 dB/cm.

Another possible technique is the technique developed by SCHOTT and described by L. Ross et al., "Single-mode integrated optical waveguides in ion-exchange in glass", Fifth European Fiber Optic Communications & Local Area Networks Exposition, EFOC/LAN 87, 3–5 June 1987, pp. 99–102. The guide thus fabricated must induce a birefringence essentially of form (that is to say birefringence due to the circular asymmetry of the waveguide 2) and not of stress (that is to say birefringence due to the circular asymmetry of the stresses applied to the waveguide 2), with the aim of preventing variations in birefringence with variations in temperature.

The concave gratings 7a and 7b are made of successive segments so as to obtain the desired curvature. The concave gratings 7a and 7b consist of dielectric segments with a higher index than that of the waveguide 2, for example of $TiO_2$, and are fabricated by deposition and/or plasma etching.

Figure 2:
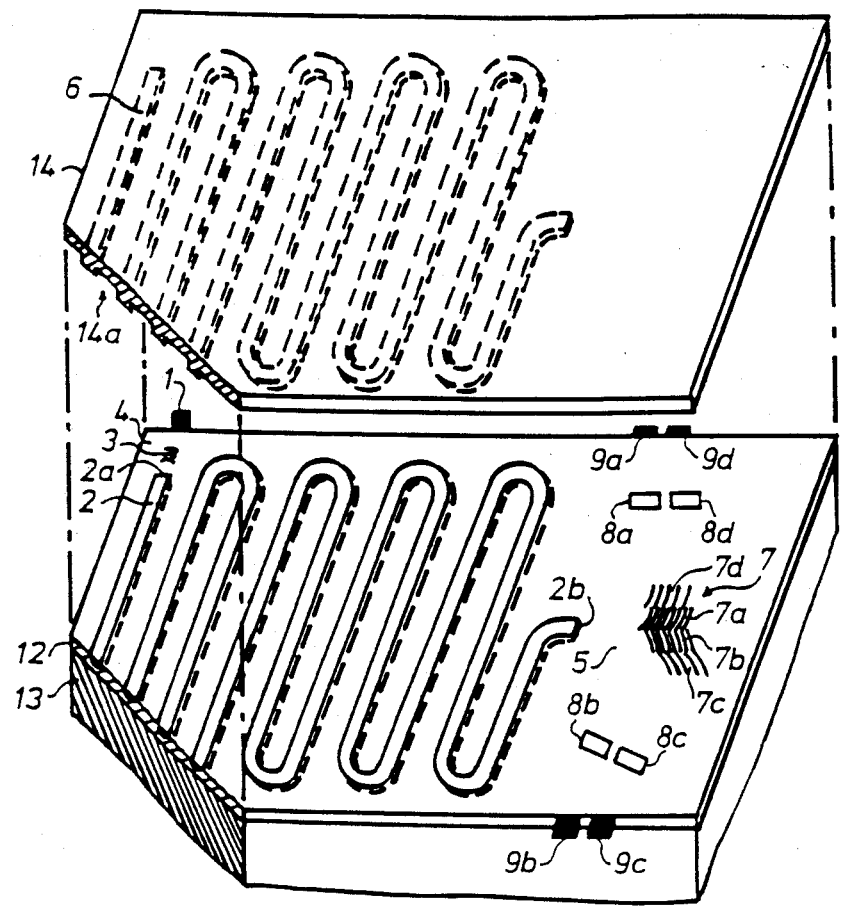
FIG. 2 is a second exemplary embodiment of the force meter of the present invention, in which the coupling/mixing grating is composed of four concave focussing gratings offset longitudinally.

A preferred embodiment of the force meter is shown in FIG. 2, in which elements similar to those in FIG. 1 have the same reference numerals. The coupling/mixing grating 7 consists of four concave focussing gratings 7a, 7b, 7c and 7d offset longitudinally with respect to each other respectively by one, two and three quarters of the beat length $L_b$. The coupling/mixing grating 7 divides the incident wave $\Sigma_i$ leaving the exit waveguide 2b into four diffracted waves $\Sigma_1$ to $\Sigma_4$ and focusses each of these waves on a detector 9a, 9b, 9c or 9d through a TM polarization filter 8a, 8b, 8c and 8d. The concave focussing gratings 7a, 7b, 7c and 7d are fed at an angle of incidence θ (FIG. 3) on the order of 21°±2° or of 67°±2°. An angle of incidence θ of 21° imposes a spatial period on the grating on the order of 0.27 μm, while an angle of incidence θ of 67° imposes a spatial period on the order of 0.66 μm in order to obtain a coupling rate between modes of 50%, with a wavelength of 0.66 μm.

The TM polarization filters 8 and 9 are arranged on the planar exit guide 5 with a refractive index $n_8$, according to a known method described by D. Gruchmann et al., "Fiber-Optic Polarizers with High Extinction Ratio", 9th European Conference on Optical Communication ECOC 83 pp. 305-308.

The two detectors 10 and 11 are installed either on the edge of the substrate 12 as described above or outside the plane of the substrate 12 where they collect the light through two new focussing diffraction gratings, not shown but capable of fabrication in a manner similar to that of the focussing coupling grating 3.

A load plate 14 is fabricated from the same material as the substrate 12 or from a glass with substantially the same thermal coefficient.

The winding arrangement 6 on the lower face 14a of the load plate 14 is fabricated by a photolithographic process, preferably from the same mask as that used for the fabrication of the single-mode guide or from a wider mask, depending on the sensitivity desired. The lower face 14a is chemically etched to several microns of depth over the whole of its surface except for the winding arrangement 6. The single-mode waveguide 2 and the winding arrangement 6 are aligned and the assembly is effected as follows:

dry in optical contact by a technique known as "anodic bonding" of glass on glass, the plate 14 then being of the same glass as the substrate 12, or by any other inorganic assembly technique; or with a film of low index optical adhesive distributed over the substrate 12 and the winding arrangement 6 of the load plate 14.

A base plate 13 of the same thermal expansion coefficient is assembled on the substrate 12 without stress by adhesion.

The present invention has been set forth above only in its preferred embodiments and any modifications thereof not expressly disclosed herein are understood to be included within the scope of the appended claims.

What is claimed:

1. An optical waveguide force meter, comprising:
   a base plate member;
   a substrate member provided on said base plate member;
   a birefringent single-mode optical waveguide formed on said substrate member, said waveguide having an entry end and an exit end;
   a single-mode laser source supported by said substrate member and said base plate member at a position adjacent the entry end of said optical waveguide;
   a focussing coupling grating provided on said substrate member at a position interposed between said laser source and the entry end of said optical waveguide;
   a coupling/mixing grating provided on said substrate member at a position adjacent the exit end of said optical waveguide, said coupling/mixing grating comprising N concave focussing gratings;
   N TM polarization filters provided on said substrate member in a region adjacent the exit end of said optical waveguide and said coupling/mixing grating;
   N detectors supported by said substrate and said base plate member in a region adjacent said TM polarization filters; and
   a load plate provided on said optical waveguide;
   wherein said coupling/mixing grating spatially separates an incident light wave exciting said optical waveguide into N diffracted waves, focusses the N diffracted waves onto said detectors, and effects a conversion of incident polarization modes $TE_i$ and $TM_i$ of said incident light wave exciting said optical waveguide into diffracted modes with energy equally distributed between $TE_d$, and $TE_{d'}$ modes, N being an integer number equal to or greater than 2.

2. The optical waveguide force meter of claim 1, further comprising a winding arrangement having substantially the same configuration as said optical waveguide and being provided on an inner surface of said load plate, said winding arrangement configuration being at least as wide as that of said optical waveguide.

3. The optical waveguide force meter of claim 1, wherein said integer number N is equal to 2 and said concave focussing gratings are offset longitudinally by a quarter of a beat length $L_b$ between two polarization modes of incident light exiting said optical waveguide.

4. The optical waveguide of claim 1, wherein said integer number N is equal to 4 and said concave focussing gratings are offset longitudinally with respect to one of said concave focussing gratings respectively by one, two and three quarters of a beat length $L_b$ between two polarization modes of incident light exiting said optical waveguide.

5. The optical waveguide force meter of claim 1, wherein a wavelength of incident light exiting said optical waveguide is 0.63 μm and said concave focussing gratings are arranged, with respect to said incident light, at an oblique angle of incidence on the order of 21°±2° or 67°±2°, the spatial period of said gratings is on the order of 0.27 μm for an angle of incidence of 21° and on the order of 0.66 for an angle of incidence of 67°, and said concave focussing gratings are affected by segmentation.

* * * * *